United States Patent [19]
Banks

[11] 3,741,349
[45] June 26, 1973

[54] NUCLEAR REACTORS
[75] Inventor: Robert Banks, Vicars Cross, England
[73] Assignee: The Nuclear Power Group Limited, Knutsford, Cheshire, England
[22] Filed: Dec. 3, 1970
[21] Appl. No.: 94,748

[30] Foreign Application Priority Data
Jan. 14, 1970 Great Britain..................... 1,785/70

[52] U.S. Cl..................................... 188/42, 188/44
[51] Int. Cl.............................................. B61h 7/12
[58] Field of Search .................................. 188/40–44

[56] References Cited
UNITED STATES PATENTS
1,471,657 10/1923 Hampton............................. 188/42
2,103,708 12/1937 Campbell........................... 188/42 X
2,970,445 2/1961 Suderow........................... 188/44 X
3,263,377 8/1966 Pfeiffer............................. 188/43 X FOREIGN PATENTS OR APPLICATIONS
217,726 1/1910 Germany.............................. 188/43

Primary Examiner—Duane A. Reger
Attorney—Holman & Stern

[57] ABSTRACT

In a nuclear reactor, clamping means for clamping together a moving member and a fixed member against the effects of seismic shock comprise wedge devices mounted between fixed and moving members, the wedge devices comprising wedges adapted to be moved into contact with opposed surfaces of moving and fixed members by an actuating member operated by external means manually or automatically. The clamping means may be associated with a fuel charging machine.

2 Claims, 3 Drawing Figures

NUCLEAR REACTORS

BACKGROUND OF THE INVENTION

1. Field of the Invention

This invention relates to nuclear reactors.

In reactors operating in areas where they may be subject to seismic shock it is necessary to provide means to clamp movable components so as to maintain them in predetermined relationships with fixed members. This is particularly the case with fuel charging devices which are arranged to move over a fuel loading face of the reactor vessel and which align charging chutes with apertures in the vessel wall, which are in turn aligned with fuel element channels in the reactor core, to permit the loading or unloading of fuel elements.

Such fuel charging devices are mounted on gantries or guide rails forming part of the reactor vessel and are capable of movement in two mutually perpendicular directions in a horizontal plane. The charging chute arrangement must be capable of vertical movement. By mounting the charging device in this way it can be maneuvered over each of a number of fuel element channels in the reactor core.

2. Summary of the Invention

According to the present invention, a moving member of the aforesaid fuel charging device is clamped in predetermined relationship with a fixed member of a nuclear reactor against the effects of seismic shock by means of wedge means mounted between the moving and fixed members, the wedge means comprising wedges adapted to be moved into contact with opposed surfaces of moving and fixed members by an actuating member operated by external means manually or automatically.

In one embodiment, each wedge means comprises two wedges separated by an actuating wedge the movement of which moves the other two wedges towards or away from each other to exert clamping forces between opposed surfaces of the moving and fixed members. Such actuating wedges may be operated by hydraulic, pneumatic, electrical or mechanical means.

In a further embodiment of the invention a fuel charging device comprises a pair of cross members adapted to move along two guide rails, attached to the reactor vessel at right angles to the cross members, and a fuel charging member adapted to move along the cross members, in which charging device wedging means are located between the cross members and the guide rails and between the fuel charging member and the cross members, said wedging means comprising wedges positioned on either side of an actuating member the movement of which causes the wedges to move apart to clamp the associated surfaces of the cross members and guide rails or the cross members and charging members as the case may be.

BRIEF DESCRIPTION OF THE DRAWINGS

The invention also consists in a clamping arrangement for components of a nuclear reactor substantially as described herein with reference to the accompanying drawings, in which.

Figure 1:
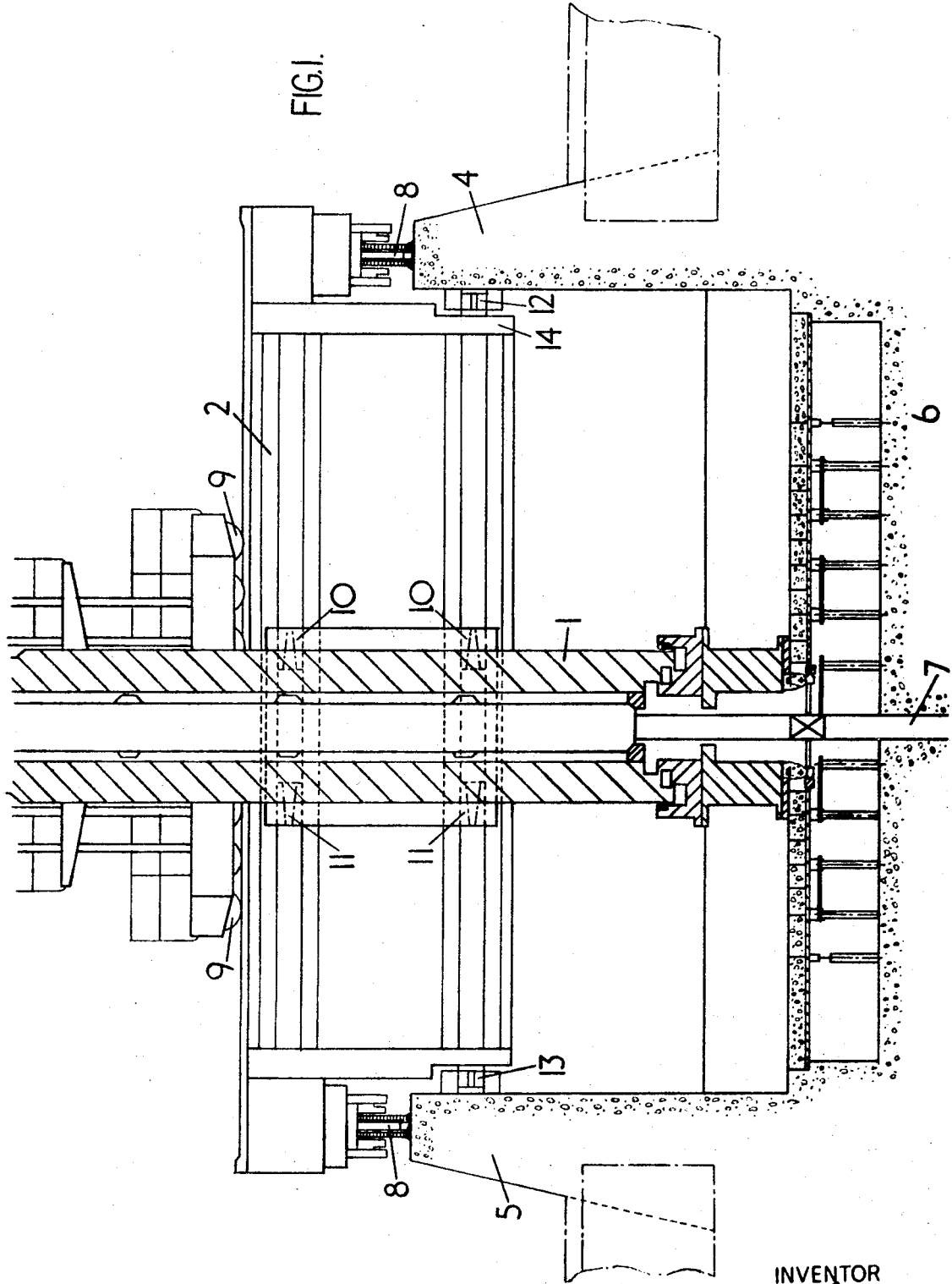
FIG. 1 is a longitudinal section through a fuel charging device in accordance with one embodiment of the invention.
Figure 2:
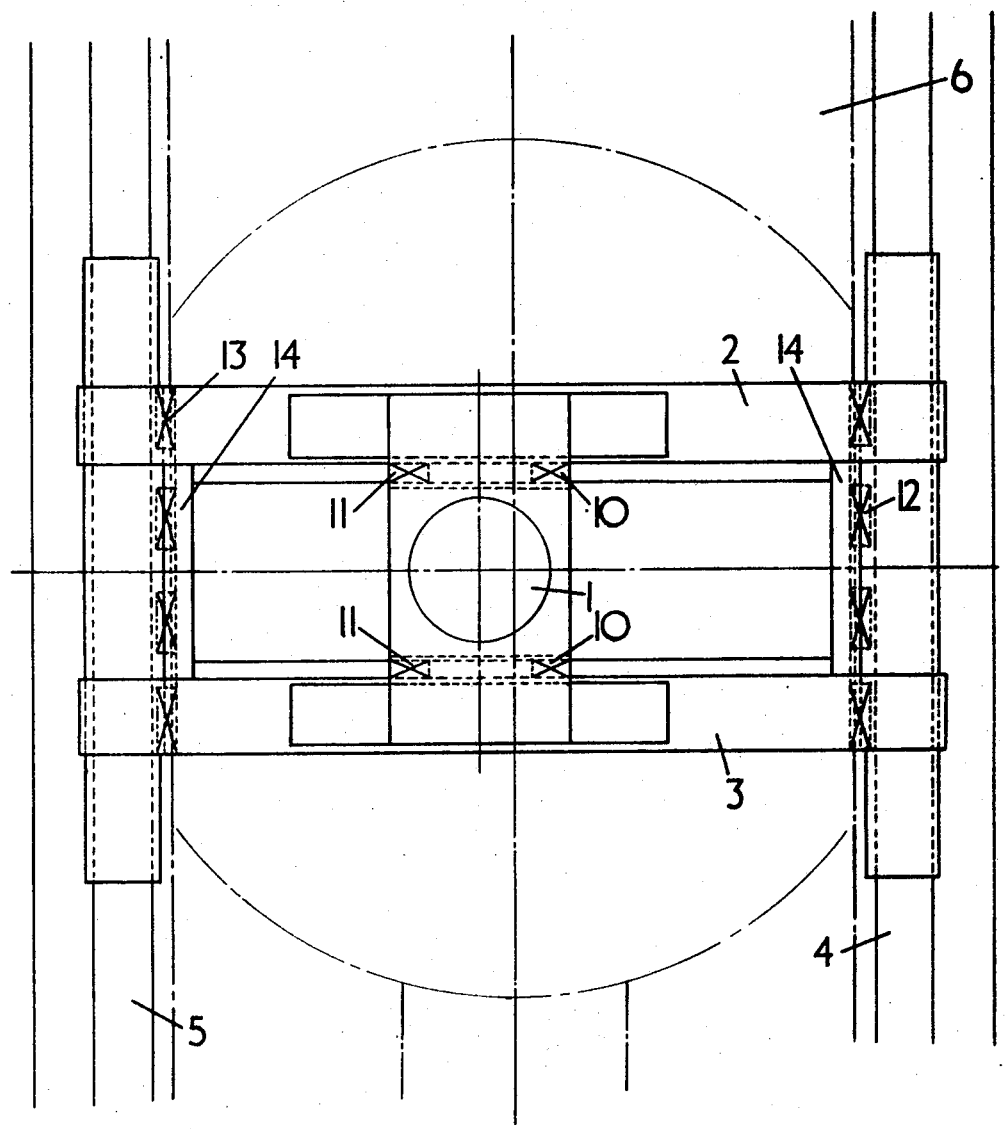
FIG. 2 is a plan view of the fuel charging device of FIG. 1.

In carrying the invention into effect in the forms illustrated by way of example and referring first of all to FIGS. 1 and 2, a fuel charging device for a nuclear reactor comprises a fuel charging member 1 adapted to move along two cross members 2 and 3. The cross members are adapted to move along guide rails on supports 4 and 5 which are attached to pressure vessel 6 of a nuclear reactor.

The fuel charging member 1 can also be moved vertically so that it can be raised or lowered over apertures in the wall of the reactor vessel which apertures are aligned with fuel channels in the reactor core in a known manner. The member 1 cooperated with a charging tube 7 which is used to insert or collect (unload) fuel by means of a grab from the reactor.

The cross members run on wheels 8 along the guide rails 4 and 5 and the charging member runs on wheels 9 along the cross members 2 and 3.

Wedging devices 10 and 11 are located between the fuel charging member 1 and the cross members 2 and 3, while wedging devices 12 and 13 are located between the charging device gantry 14 and the guide rail supports 4 and 5.

Figure 3:
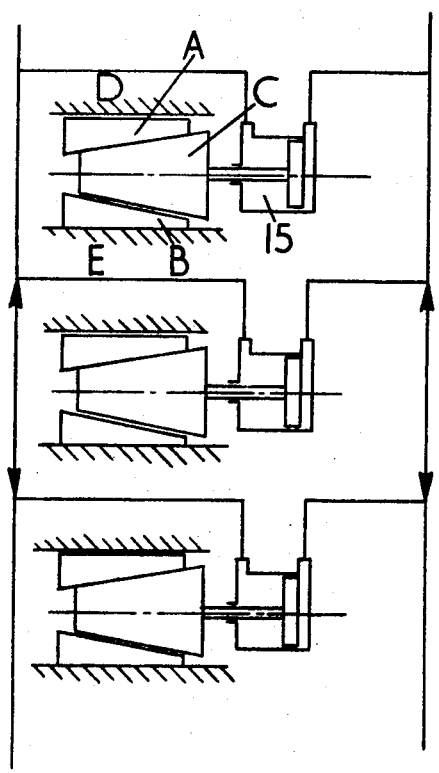
FIG. 3 shows details of wedging devices incorporated in the fuel charging device of FIGS. 1 and 2.

The wedging means may be in the form shown in FIG. 3 comprising two wedges A and B located on either side of an actuating member C also in the form of a wedge having a complementary taper to the taper of wedges A and B.

When the fuel charging device is being moved, the wedges are located as shown in FIG. 3 where there is a clearance between wedge A and the surface D with which clamping is to take place. When the actuating member C is moved, the wedge A moves into contact with the surface D with which it is associated and the wedges clamp together the two surfaces in contact therewith i.e., the surfaces D and E in FIG. 3. The surfaces D and E would represent respectively the surfaces of cross member and charging member or cross member and guide rail as the case may be. If the actuating member moves for instance to the right in FIG. 3 the wedge A is released and a clearance is again resumed permitting relative movement between surfaces D and E.

In the form illustrated the actuating members are connected to hydraulic actuators 15. A hydraulic fluid can be supplied to the actuator 15 to move the piston therein to the right or to the left.

In operation, when the fuel charging device is located over a fuel channel the operator will operate the hydraulic actuators causing the wedge devices to clamp the gantry 14 and member 1 in position. Even if a seismic shock should then occur the clamping effect of the wedging devices maintains the predetermined relationship of charging device and reactor vessel.

If the charging device is moving when a seismic shock occurs the hydraulic actuator 15 can be operated automatically in response to a signal from a seismic shock detector to operate the wedging devices and effect the necessary clamps.

The number of wedging members used is chosen to suit circumstances requirements in individual cases.

I claim:

1. A fuel charging apparatus for a nuclear reactor, comprising: a fuel charging member having a plurality of rolling members and supported thereby for linear movement in a first direction on a pair of spaced parallel elongated members forming a frame; a pair of parallel spaced guide rails disposed at right angles below said pair of spaced parallel elongated members, and means for enabling said frame to move linearly at right angles to said first direction on and guided by said guide rails; at least one wedging means which is the first wedging means disposed between said fuel charging member and said frame for controllably arresting relative movement therebetween in said first direction; at least a second wedging means disposed between said frame and said spaced parallel guide rails for controllably arresting relative movement therebetween in a direction at right angles to said first direction, said first wedging means including,
a first wedging piece rigidly secured to said frame,
a second wedging piece disposed adjacent and close to said fuel charging member so as to be moved into braking contact therewith,
an immobile first central wedge piece disposed in between said first and second wedge pieces and having an axial taper which is substantially symetrical and complementary to said first and second wedge pieces,
an actuating and supporting means connected to said first central wedge piece for axially moving said first central wedge piece so as to cause a braking engagement of said second wedge piece with the fuel charging member, thereby to arrest relative movement between the frame and said fuel charging member;

said second wedging means including,
a third wedging piece rigidly secured to said guide rails,
a fourth wedging piece disposed adjacent and close to said frame so as to be moved into braking contact therewith,
an immobile second central wedge piece disposed in between said third and fourth wedge pieces and having an axial taper which is substantially symetrical and complementary to said third and fourth wedge pieces,
a second actuating and supporting means connected to and for axially moving said second central wedge piece so as to cause a braking engagement of said fourth wedging piece with the frame, thereby to arrest relative movement between said frame and the guide rails in said second direction.

2. A fuel charging apparatus as claimed in claim 1, wherein said actuating and supporting means and said second actuating supporting means each comprise a piston and rod moving in a cylinder.

* * * * *